(12) United States Patent
Lum et al.

(10) Patent No.: US 8,347,350 B2
(45) Date of Patent: *Jan. 1, 2013

(54) SYSTEMS AND METHODS OF CONTROLLING NETWORK ACCESS

(75) Inventors: Stacey C. Lum, Los Altos, CA (US); Yuhshiow Alice Lee, Saratoga, CA (US)

(73) Assignee: InfoExpress, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/371,381

(22) Filed: Feb. 10, 2012

(65) Prior Publication Data

US 2012/0131637 A1 May 24, 2012

Related U.S. Application Data

(63) Continuation of application No. 13/157,309, filed on Jun. 10, 2011, now Pat. No. 8,117,645, which is a continuation of application No. 12/273,037, filed on Nov. 18, 2008, now Pat. No. 8,051,460, which is a continuation of application No. 10/949,179, filed on Sep. 24, 2004, now Pat. No. 7,523,484.

(60) Provisional application No. 60/505,582, filed on Sep. 24, 2003, provisional application No. 60/513,080, filed on Oct. 21, 2003.

(51) Int. Cl.
*H04L 9/00* (2006.01)
*H04L 9/32* (2006.01)
(52) U.S. Cl. ...................... 726/1; 726/2; 726/3
(58) Field of Classification Search ................. 726/1–4, 726/11–12, 15; 713/150, 153, 155, 168; 380/270; 709/220–221, 223–225, 227–228
See application file for complete search history.

(56) References Cited

U.S. PATENT DOCUMENTS

| 1,830,383 A | 11/1931 | Bos |
| 1,860,326 A | 5/1932 | Jackson |
| 2,131,067 A | 9/1938 | Paden |
| 2,247,592 A | 7/1941 | Swift |
| 2,519,435 A | 8/1950 | Byrd, Jr. |
| 2,731,056 A | 1/1956 | Anson |

(Continued)

FOREIGN PATENT DOCUMENTS

JP  2005-079706  3/2005

(Continued)

OTHER PUBLICATIONS

"Network Access Control from Mirage Networks," Mirage Networks, 2006.

(Continued)

*Primary Examiner* — Hosuk Song
(74) *Attorney, Agent, or Firm* — Lewis and Roca LLP

(57) ABSTRACT

A new approach to network security includes manipulating an access point such that an initial communication from an external device is passed to a restricted subset of a computing network including a gatekeeper. The gatekeeper is configured to enforce a security policy against the external device before granting access to a less-restricted subset of the computing network. If requirements of the security policy are satisfied, then the gatekeeper reconfigures the access point such that further communication from the external device may be received by elements of the less-restricted subset. Enforcement of the security policy optionally includes performing a security audit of the external device.

19 Claims, 10 Drawing Sheets

U.S. PATENT DOCUMENTS

| | | | |
|---|---|---|---|
| 3,100,664 | A | 8/1963 | Duval |
| 3,701,557 | A | 10/1972 | Centolante |
| 4,181,339 | A | 1/1980 | Rigsby |
| 4,951,984 | A | 8/1990 | Huang |
| 5,010,622 | A | 4/1991 | Morita |
| 5,606,668 | A | 2/1997 | Shwed |
| 5,701,635 | A | 12/1997 | Hawkes |
| 5,835,481 | A | 11/1998 | Akyol et al. |
| 5,842,002 | A | 11/1998 | Schnurer |
| 5,852,722 | A | 12/1998 | Hamilton |
| 5,944,368 | A | 8/1999 | Hastings |
| 5,950,195 | A | 9/1999 | Stockwell et al. |
| 5,968,176 | A | 10/1999 | Nessett et al. |
| 6,006,259 | A | 12/1999 | Adelman et al. |
| 6,044,402 | A | 3/2000 | Jacobson et al. |
| 6,119,162 | A | 9/2000 | Li et al. |
| 6,304,973 | B1 | 10/2001 | Williams |
| 6,363,489 | B1 | 3/2002 | Comay et al. |
| 6,393,484 | B1 | 5/2002 | Massarani |
| 6,671,737 | B1 | 12/2003 | Snowdon et al. |
| 6,678,835 | B1 | 1/2004 | Shah et al. |
| 6,745,333 | B1 | 6/2004 | Thomsen |
| 6,769,000 | B1 | 7/2004 | Akhtar et al. |
| 6,834,414 | B2 | 12/2004 | Chiu |
| 6,980,660 | B1 * | 12/2005 | Hind et al. .................... 380/282 |
| 6,988,133 | B1 | 1/2006 | Zavalkovsky et al. |
| 7,042,988 | B2 | 5/2006 | Juitt et al. |
| 7,055,173 | B1 | 5/2006 | Chaganty et al. |
| 7,194,763 | B2 | 3/2007 | Potter et al. |
| 7,299,294 | B1 | 11/2007 | Bruck et al. |
| 7,325,246 | B1 | 1/2008 | Halasz et al. |
| 7,350,226 | B2 | 3/2008 | Moriconi et al. |
| 7,469,418 | B1 | 12/2008 | Wilkinson et al. |
| 7,515,569 | B2 | 4/2009 | Prasad |
| 7,523,484 | B2 | 4/2009 | Lum |
| 7,590,733 | B2 | 9/2009 | Lum |
| 7,720,050 | B1 * | 5/2010 | Blank .......................... 370/352 |
| 7,752,320 | B2 | 7/2010 | Kappes |
| 8,051,460 | B2 * | 11/2011 | Lum et al. ....................... 726/1 |
| 8,108,909 | B2 | 1/2012 | Lum |
| 8,112,788 | B2 | 2/2012 | Lum |
| 8,117,645 | B2 | 2/2012 | Lum |
| 2002/0010869 | A1 | 1/2002 | Kim |
| 2002/0023273 | A1 | 2/2002 | Song |
| 2002/0029276 | A1 | 3/2002 | Bendinelli et al. |
| 2002/0073337 | A1 | 6/2002 | Ioele et al. |
| 2002/0120749 | A1 | 8/2002 | Widegren et al. |
| 2003/0012205 | A1 | 1/2003 | Foti et al. |
| 2003/0023880 | A1 | 1/2003 | Edwards et al. |
| 2003/0046586 | A1 | 3/2003 | Bheemarasetti et al. |
| 2003/0126464 | A1 | 7/2003 | McDaniel et al. |
| 2003/0131262 | A1 | 7/2003 | Goddard |
| 2003/0191966 | A1 | 10/2003 | Gleichauf |
| 2003/0208694 | A1 | 11/2003 | Fang |
| 2003/0229808 | A1 | 12/2003 | Heintz et al. |
| 2004/0010719 | A1 | 1/2004 | Daenen et al. |
| 2004/0024885 | A1 | 2/2004 | Bush, III et al. |
| 2004/0054926 | A1 | 3/2004 | Ocepek et al. |
| 2004/0098610 | A1 | 5/2004 | Hrastar |
| 2004/0103314 | A1 | 5/2004 | Liston |
| 2004/0162994 | A1 | 8/2004 | Cohen et al. |
| 2004/0181690 | A1 | 9/2004 | Rothermel et al. |
| 2004/0193912 | A1 | 9/2004 | Li et al. |
| 2004/0243835 | A1 | 12/2004 | Terzis et al. |
| 2005/0027837 | A1 | 2/2005 | Roese et al. |
| 2005/0044197 | A1 | 2/2005 | Lai |
| 2005/0050365 | A1 | 3/2005 | Seki et al. |
| 2005/0081058 | A1 | 4/2005 | Chang et al. |
| 2005/0278775 | A1 | 12/2005 | Ross |
| 2006/0050703 | A1 | 3/2006 | Foss |
| 2006/0089938 | A1 | 4/2006 | Leonard et al. |
| 2006/0095968 | A1 | 5/2006 | Portolani et al. |
| 2006/0147043 | A1 | 7/2006 | Mann |
| 2006/0161970 | A1 | 7/2006 | Hopen et al. |
| 2006/0164199 | A1 | 7/2006 | Gilde et al. |
| 2007/0064689 | A1 | 3/2007 | Shin et al. |
| 2007/0112574 | A1 | 5/2007 | Greene |
| 2007/0157306 | A1 | 7/2007 | Elrod et al. |
| 2008/0060067 | A1 | 3/2008 | Kim et al. |
| 2008/0209044 | A1 | 8/2008 | Forrester |
| 2009/0043765 | A1 | 2/2009 | Pugh |
| 2009/0083830 | A1 | 3/2009 | Lum |
| 2012/0246698 | A1 | 9/2012 | Lum |
| 2012/0254937 | A1 | 10/2012 | Lum |
| 2012/0254938 | A1 | 10/2012 | Lum |
| 2012/0254939 | A1 | 10/2012 | Lum |

FOREIGN PATENT DOCUMENTS

| | | |
|---|---|---|
| WO | WO 2006/029217 | 3/2006 |

OTHER PUBLICATIONS

"Network Access Quarantine Control in Microsoft Windows Server 2003." Windows Server System, Published Mar. 2003, Updated Jul. 29, 2009, 37 pages, Microsoft Corporation, Redmond, WA, USA.

"Packet Fence Overview," Packet Fencer, TM., located at http://www.packetfence.org, downloaded: 2006.

PacketFence Documentation, URL http://packetfence.org, Release 1.5.1, Sep. 8, 2005, modified Jul. 13, 2006, 40 pages.

U.S. Appl. No. 11/227,679, Stacey C. Lum, Dynamic Address Assignment For Access Control on DHCP Networks, filed Sep. 14, 2005.

U.S. Appl. No. 11/356,555, Stacey Lum, Peer Based Network Access Control, filed Feb. 16, 2006.

U.S. Appl. No. 11/433,225, Stacey C. Lum, Network Access Control Management, filed May 11, 2006.

U.S. Appl. No. 11/433,723, Stacey Lum, Network access control including dynamic policy enforcement point, filed May 11, 2006.

U.S. Appl. No. 13/157,308, Stacy C. Lum, Systems and Methods of Controlling Network Access, filed Jun. 10, 2011.

U.S. Appl. No. 13/157,309, Stacy C. Lum, Systems and Methods of Controlling Network Access, filed Jun. 10, 2011.

U.S. Appl. No. 13/157,310, Stacy C. Lum, Systems and Methods of Controlling Network Access, filed Jun. 10, 2011.

Whalen, Sean, "An Introduction to ARP Spoofing," at http://node99.org/projects/arpsppf, updated May 2001, 7 pages.

U.S. Appl. No. 10/949,179, Office Action mailed Feb. 29, 2008.

U.S. Appl. No. 12/273,037, Office Action mailed Jul. 9, 2010.

U.S. Appl. No. 13/157,308, Office Action mailed Aug. 4, 2011.

U.S. Appl. No. 13/157,309, Office Action mailed Aug. 4, 2011.

U.S. Appl. No. 13/157,310, Office Action mailed Aug. 5, 2011.

U.S. Appl. No. 13/523,849, Office Action mailed Sep. 28, 2012.

* cited by examiner

SYSTEMS AND METHODS OF CONTROLLING NETWORK ACCESS

CROSS-REFERENCE TO RELATED APPLICATIONS

The present application is a continuation of U.S. patent application Ser. No. 13/157,309 filed Jun. 10, 2011 (now U.S. Pat. No. 8,117,645), which is a continuation and claims the priority benefit of U.S. patent application Ser. No. 12/273,037 filed Nov. 18, 2008 (now U.S. Pat. No. 8,051,460), which is a continuation and claims the priority benefit of U.S. patent application Ser. No. 10/949,179 filed Sep. 24, 2004 (now U.S. Pat. No. 7,523,484), which claims the priority benefit of U.S. provisional patent application No. 60/505,582 filed Sep. 24, 2003 and U.S. provisional patent application No. 60/513,080 filed Oct. 21, 2003, the disclosures of the aforementioned applications being incorporated herein by reference.

BACKGROUND

1. Field of the Invention

The invention is in the field of computing systems and more specifically in the field of network security.

2. Description of the Related Art

Several approaches to controlling external access to computing networks have been developed. The goals in developing these approaches include limiting access to authorized users and assuring that computing devices employed by these users do not include malicious computing code such as viruses, worms, or Trojan horses. The need for access control has grown with users' demands for accessing secure networks over the Internet and from personal devices such as laptop computers and personal digital assistants.

A first level of access control is achieved by requiring authentication of a user. This may be accomplished by requiring the user to enter a username and password or by reading a MAC address or other identifying information from an access device. In some systems, a network switch is programmed to grant access to a secure network only after proper authentication is achieved. Systems capable of using this approach include those using a proprietary VMPS protocol from Cisco Systems, Inc. of San Jose, Calif. or using a IEEE 802.1x standard protocol.

Reliance on mere user authentication includes several disadvantages. For example, there are no provisions to assure that an access device used by the authenticated user meets network security policies. The access device may have out-of-date virus software, may have security vulnerabilities, or may be otherwise compromised. Further, this approach requires that access points (e.g., network switches) support one of a specific set of access protocols. Because many access points do not support VMPS, 802.1x, or a similar protocol, implementation of this approach on a large preexisting network, such as a corporate network, may be prohibitively expensive.

A greater level of access control may be achieved by including a gatekeeper between the secure network and the access device. The gatekeeper is configured to ensure that the access device conforms to a predetermined security policy. FIG. 1 is a block diagram of a Secure Network, generally designated 100, including two instances of a Gatekeeper 110 each associated with a different instance of an Access Point 120. Secure Network 100 further includes, as an illustrative example, a network File Server 130, a Network PC (personal computer) 140 and a Printer 150 included in and connected via, a local area network designated LAN 125.

Each instance of Access Point 120 may include a large number of individual communication ports. These ports are used to connect through GateKeeper 110 to other elements within Secure Network 100 such as File Server 130 or LAN 125. Large corporate networks may include many instances of Access Point 120, each including hundreds of individual communication ports and being associated with an instance of GateKeeper 110.

Some instances of Access Point 120 are capable of supporting virtual local area networks (VLANs). VLANs are generated by associating communication ports within Access Point 120 with separate virtual networks. For example, one Access Device 160 may be placed on a different VLAN than another Access Device 160 by assigning the communication ports of Access Point 120 to separate VLANs. From the point of view of these devices, the effect of a VLAN is equivalent to having a separate hardwired network.

GateKeeper 110 is configured to control access to Secure Network 100. In addition to authenticating users who wish to access Secure Network 100 using an Access Device 160, GateKeeper 110 is configured to ensure that Access Device 160 conforms to a predetermined security policy, before granting access to Secure Network 100. For example, Gate-Keeper 110 may make certain that Access Device 160 has up-to-date virus software and encryption protocols as proscribed by the security policy. Once GateKeeper 110 has verified that Access Device 160 satisfies the security policy, Access Device 160 is allowed to communicate through Gate-Keeper 110 to LAN 125.

A disadvantage of the use of GateKeeper 110, as practiced in the prior art, is that all communications between Access Device 160 and LAN 125 pass through GateKeeper 110. For large networks including many instances of Access Point 120, each of which may include many communication ports, this can be a significant burden. The use of one instance of Gate-Keeper 110 to support numerous instances of Access Device 160 is limited by bandwidth and required sophistication (e.g., cost) of GateKeeper 110. It is undesirable for GateKeeper 110 to become a limiting factor on the bandwidth of communication between instances of Access Device 160 and Secure Network 100. Further, the use of a separate GateKeeper 110 for each instance of Access Device 160 or Access Point 120 is often prohibitively expensive. Even if a separate GateKeeper is used for each Access Point 120, there is no isolation between compliant and non-compliant Access Devices 160 which are attached to the same Access Point 120.

There is, therefore, a need for improved systems and methods of controlling access to secure networks.

SUMMARY OF THE CLAIMED INVENTION

Systems and methods of the invention include a protected network physically or logically divided into a restricted subset and one or more less-restricted subsets. Requests from an access device for access to the less-restricted subset are first passed to the restricted subset. Elements (e.g., a gatekeeper) of the restricted subset are then used to apply security policies to the access device and if security policies are satisfied, the access device is granted access to a less-restricted subset of the protected network. The passing of access requests to the restricted subset and granting of access are accomplished by configuring and reconfiguring a communication port of an access point. After access is granted, further communication between the access device and the protected network can include access to the less restricted subset.

Typically, the less-restricted subset of the protected network and the restricted subset of the protected network are characterized by Virtual Local Area Networks (e.g., VLANs) defined within the access point and optionally by access control lists (ACL) of a router, firewall, or switch situated between the VLAN and the protected network. Different VLANs within the same access point, or within different access points, may be configured to characterize a plurality of restricted subsets and/or a plurality of less-restricted subsets within the protected network. A communication port of the access point is configured such that network traffic directed at the protected network is initially passed through a restricted VLAN rather than through a less-restricted VLAN. The restricted VLAN allows network traffic to pass to the restricted subset of the protected network and is typically restricted in the sense that it only allows access to elements of the protected network that are configured to communicate with an access device whose security characteristics are unknown or questionable. In contrast, the less-restricted VLAN allows access to the less-restricted subset of the protected network and, in typical embodiments, to elements of both the less-restricted subset and the restricted subset. For example, the restricted VLAN allows traffic to pass to a gatekeeper configured to receive requests for access to the less-restricted VLAN, and to determine if, and to what extent, access may be allowed. To grant access, the gatekeeper sends commands to the access point in order to reconfigure a communication port to which the access device is connected. The reconfiguration typically includes reassigning the communication port from the restricted VLAN to the less-restricted VLAN.

Subsequent to reconfiguration of the communication port, network traffic can pass from the access device through the less-restricted VLAN to elements of both the less-restricted subset and (optionally) the restricted subset. This network traffic need not pass through the gatekeeper. Thus, in various embodiments of the invention a gatekeeper is used to grant access to the less-restricted subset, and after access has been granted, most network traffic does not need to pass through the gatekeeper. For example, in some embodiments, the gatekeeper only receives requests to access the less-restricted network and data regarding access to and security of the protected network. This data may be received from administrators, access devices, access points, routers, and/or other devices on the network. These limited communications with gatekeeper occur both before and after reconfiguration of the communication port, and eliminate a significant disadvantage associated with the use of prior art gatekeepers.

Various embodiments of the invention include a computing network comprising a less-restricted subset of the computing network, access to the less-restricted subset being responsive to a first VLAN, a restricted subset of the computing network including a gatekeeper, the gatekeeper configured to receive requests for access to the less-restricted subset from an access device and to issue commands configured to allow access to the less-restricted subset, access to the restricted subset of the computing network being responsive to a second VLAN, and at least one access point including a communication port configurable for communication with the less-restricted subset or alternatively for communication with only the restricted subset, configuration of the communication port including association of the communication port alternatively with the first VLAN or the second VLAN, configuration of the communication port being responsive to the commands issued by the gatekeeper. Other elements are optional.

Various embodiments of the invention include a network gatekeeper comprising at least one security policy including requirements that must be satisfied before an access device is granted access to a less-restricted subset of a protected network, a policy auditor configured to audit an access device using the at least one security policy, in response to a request to access the less-restricted subset of the protected network, the request being sent from the access device to the gatekeeper via a communication device, and an access control configured to reconfigure the communication device such that data sent from the access device can be received by the less-restricted subset of the protected network rather than merely a restricted subset of the protected network, if the audit results in a determination that the access device meets the requirements of the at least one security policy, the restricted subset of the protected network including the gatekeeper. Other elements are optional.

Various embodiments of the invention include a method of granting access to a protected network, the method comprising receiving a request for access to a less-restricted subset of the protected network from an access device external to the protected network, the request being received through a communication port of an access point, the communication port configured for communicating between the access device and a restricted subset of the protected network, the restricted subset including a gatekeeper, applying a security policy to the access device, responsive to the request, and reconfiguring the communication port for communicating between the access device and the less-restricted subset of the protected network, if requirements of the security policy are satisfied. Other steps are optional.

Various embodiments of the invention include a method of granting access to a protected network, the method comprising receiving a first communication from an access device at a communication port, the communication port being configured to pass the first communication to a restricted subset of the protected network, the restricted subset including a gatekeeper configured to enforce security policy for access to a less-restricted subset of the protected network, receiving a command from the gatekeeper, the command being responsive to the received first communication and being configured to reconfigure the communication port to communicate data to the less-restricted subset of the protected network, configuring the communication port to communicate data to the less-restricted subset of the protected network rather than merely the restricted subset of the protected network, responsive to the received command, and receiving a second communication from the access device at the communication port, the communication port now being configured to pass the second communication to the less-restricted subset of the protected network. Other steps are optional.

Various embodiments of the invention include a computing network comprising means for dividing the computing network into a restricted subset and a less-restricted subset, means for receiving a request at the restricted subset, the request being to access the less-restricted subset, means for enforcing a security policy in response to the request, and means for allowing communication to the less-restricted subset, responsive to the enforcement of the security policy, the communication to the less-restricted subset not necessarily passing through the restricted subset. Other elements are optional.

In various embodiments of the invention the restricted subset of a computing network includes elements configured to communicate with access devices having an unknown or questionable security status, and the less-restricted subset of the computing network includes those elements of the computing network not included in the restricted subset.

DETAILED DESCRIPTION

Access to a protected computing network is controlled by manipulating a communication port within an access point. When an access request is first received, the communication port is configured to pass the request to a restricted subset of a protected computing network. This restricted subset includes a gatekeeper configured to administer a security policy governing access to those parts of the protected computing network that are not part of the restricted subset. Those parts of the protected computing network that are not part of the restricted network are considered to be in a less-restricted subset. The less-restricted subset being less restricted relative to the restricted subset in terms of what elements may be included in each subset. If the device requesting access satisfies requirements of the security policy, then the gatekeeper sends commands to the access point in order to reconfigure the communication port through which the access request was received. The communication port is reconfigured such that further communication from the access device is passed to the less-restricted subset as well as, optionally, the restricted subset. In some embodiments, the less-restricted subset and the restricted subset are characterized by VLANs defined within the protected network.

Figure 1:
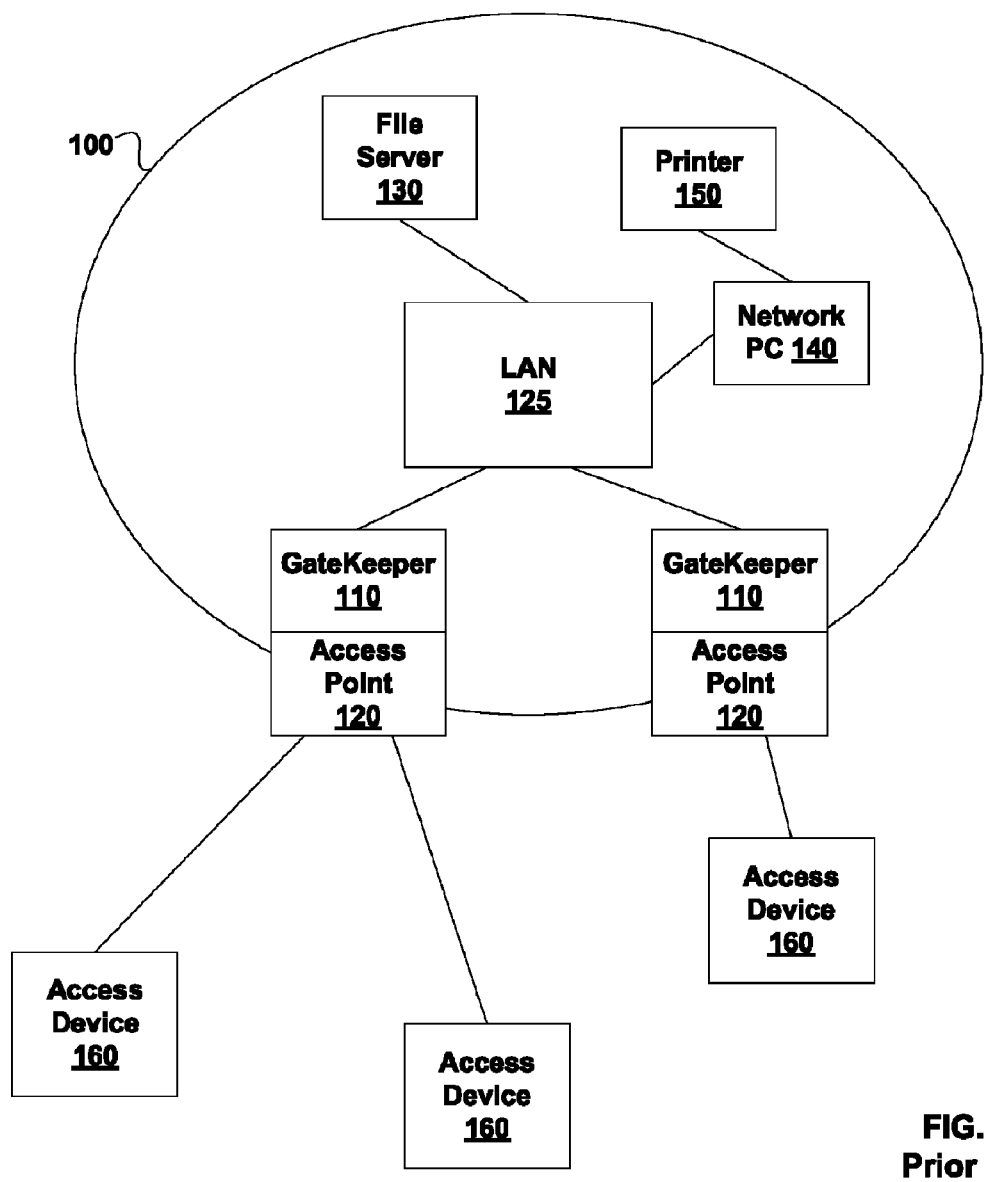
FIG. 1 is a block diagram of a prior art computing network.
Figure 2:
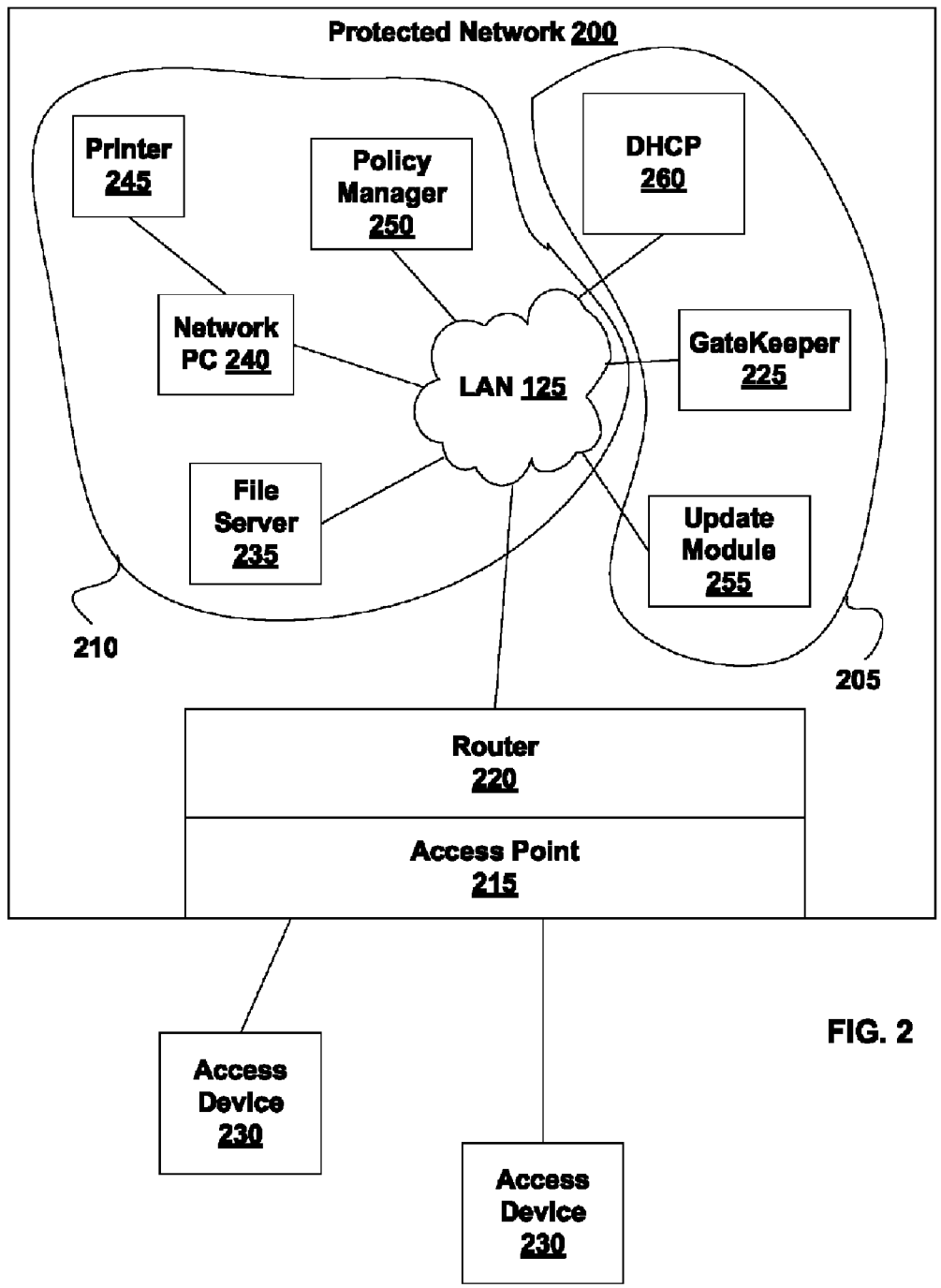
FIG. 2 is a block diagram of a protected network, according to various embodiments of the invention.

FIG. 2 is a block diagram of a Protected Network 200, according to various embodiments of the invention. Protected Network 200 is either physically or logically divided into a Restricted Subset 205 and a Less-Restricted Subset 210. Access to Protected Network 200 is possible through an Access Point 215 (a communication device) and an optional Router 220. As is described further herein this access is under the control of a GateKeeper 225. GateKeeper 225 is configured to enforce a security policy against one or more Access Device 230 requesting access to Less-Restricted Subset 210. Typically, Less-Restricted Subset 210 and Restricted Subset 205 are characterized by VLAN settings within Access Point 215. Access Device 230 and Access Point 215 are connected by a communication channel such as a cable, the Internet, a telephone network, other computing network, and/or the like. In some embodiments, a network access server (not shown) is included between Access Device 230 and Access Point 215.

In various embodiments, Protected Network 200 includes a corporate network, telephone network, private network, local area network, wide area network, wireless network, communication network, government network, university network, and/or the like. Restricted Subset 205 is a subset of Protected Network 200 including at least GateKeeper 225. In some embodiments, Restricted Subset 205 further includes a DHCP (dynamic host configuration protocol service) 260 configured to assign and manage network addresses, and/or an Update Module 255 configured for providing security updates to Access Device 230. For example, in one embodiment, Restricted Subset 205 includes a server configured to function as DHCP 260 and a server configured to function as GateKeeper 225. In one embodiment, Restricted Subset 205 includes a single computing device configured to function as both Update Module 255 and GateKeeper 225.

Less-Restricted Subset 210 includes those elements of Protected Network 200 not included in Restricted Subset 205. Less-Restricted Subset 210 optionally includes devices such as a File Server 235, a Network PC 240, a Printer 245, or the like. In some embodiments, Protected Network 200 includes elements having a hierarchy of access restrictions. For example, access to Network PC 240 may require a higher level of authority than access to File Server 235. In this case, as described further herein, access control lists within Router 220 are optionally used to independently control access to specific devices within Less-Restricted Subset 210. Protected Network 200 may be large, including tens, hundreds, or thousands of devices. The hierarchy of access restrictions may be enforced by a hierarchical set of security policies defined using Policy Manager 250. In various embodiments, Router 220 and Access Point 215 may be considered part of Restricted Subset 205 or Less-Restricted Subset 210.

GateKeeper 225 is configured to enforce one or more security policies against an instance of Access Device 230 attempting to access Protected Network 200. The security polices may include requirements for user identification such as user names and passwords, configuration requirements relating to the configuration of Access Device 230, application requirements relating to applications running on Access Device 230, or the like. For example, in one embodiment GateKeeper 225 is configured to enforce a security policy that requires a user of Access Device 230 to provide a username and password, requires Access Device 230 to be running an operating system with specific security patches installed, requires that Access Device 230 not be connected to any insecure devices, and requires that Access Device 230 have current antivirus software installed.

In some embodiments, GateKeeper 225 is configured to enforce several alternative security policies having different levels of requirements, and to determine which security policy to enforce based on the identity of Access Device 230, the identity of a user of Access Device 230, those elements of Less-Restricted Subset 210 to which access is requested, and/or the like. For example, a request to access File Server 235 may have to satisfy a security policy that includes scanning Access Device 230 for malicious code, while a request to access Printer 245 may have to satisfy a security policy that includes establishing a user identity. Security policies may be stored on GateKeeper 225, on Policy Manager 250, or elsewhere accessible to Restricted Subset 205.

In some embodiments, a single instance of GateKeeper 225 is configured to manage access through more than one Access Point 215 and/or to manage access to more than one Protected Network 200. As is described further herein, management of Access Point 215 is accomplished by configuring and reconfiguring one or more communication ports within Access Point 215, and optionally setting access control lists within Router 220. In some embodiments Protected Network 200 includes a plurality of Access Point 215, a plurality of GateKeeper 225 and/or a plurality of Restricted Subset 205. Further details of GateKeeper 225 and Access Point 215 are discussed below.

Access Device 230 is a computing device configured to operate as an end point (EP) in a communication channel including Access Point 215 and Access Device 230. In various embodiments, Access Device 230 is a personal computer, a personal digital assistant, a telephone, a wireless device, a communication device such as a router, Ethernet card, wireless card, another access point, a network device, or the like. Access Device 230 is optionally identified by a MAC address, by a cookie, by data stored on Access Device 230, by a user name, an IP address, a network address, or the like.

In some embodiments, Access Device 230 is configured to execute a software and/or hardware agent for communicating with GateKeeper 225. For example, in one embodiment, Access Device 230 includes an agent configured to monitor code running on Access Device 230 and report any suspicious code to GateKeeper 225. In another example, Access Device 230 may include software and/or hardware configured to monitor other devices connected to Access Device 230 and to report information about these devices (e.g., their security statuses or MAC addresses) to GateKeeper 225.

Policy Manager 250 is configured to centrally create, update, and distribute security policies enforced by one or more GateKeeper 225. For example, in various embodiments, Policy Manager 250 is configured to manage passwords, to specify access privileges, to specify requirements of security policies, or the like. In some embodiments, Policy Manager 250 is configured to establish several security policies and to specify conditions under which each of the security policies should be used. For example, a security policy may be selected for use responsive to a device type of Access Device 230 and/or the elements of Protected Network 200 to which access has been requested.

Update Module 255 is configured for remotely modifying Access Device 230, or a device connected to Access Device 230, in order to improve compliance with a security policy. For example, if it is found that Access Device 230 includes out-of-date antivirus software, then Update Module 255 may facilitate updating of the antivirus software on Access Device 230. In some embodiments, Update Module 255 is configured to update an agent executing on Access Device 230. Update Module 255 is optionally included in Less-Restricted Subset 210 or external to Protected Network 200. Update Module 255 optionally operates responsive to a security policy and/or to GateKeeper 225.

Figure 3A:
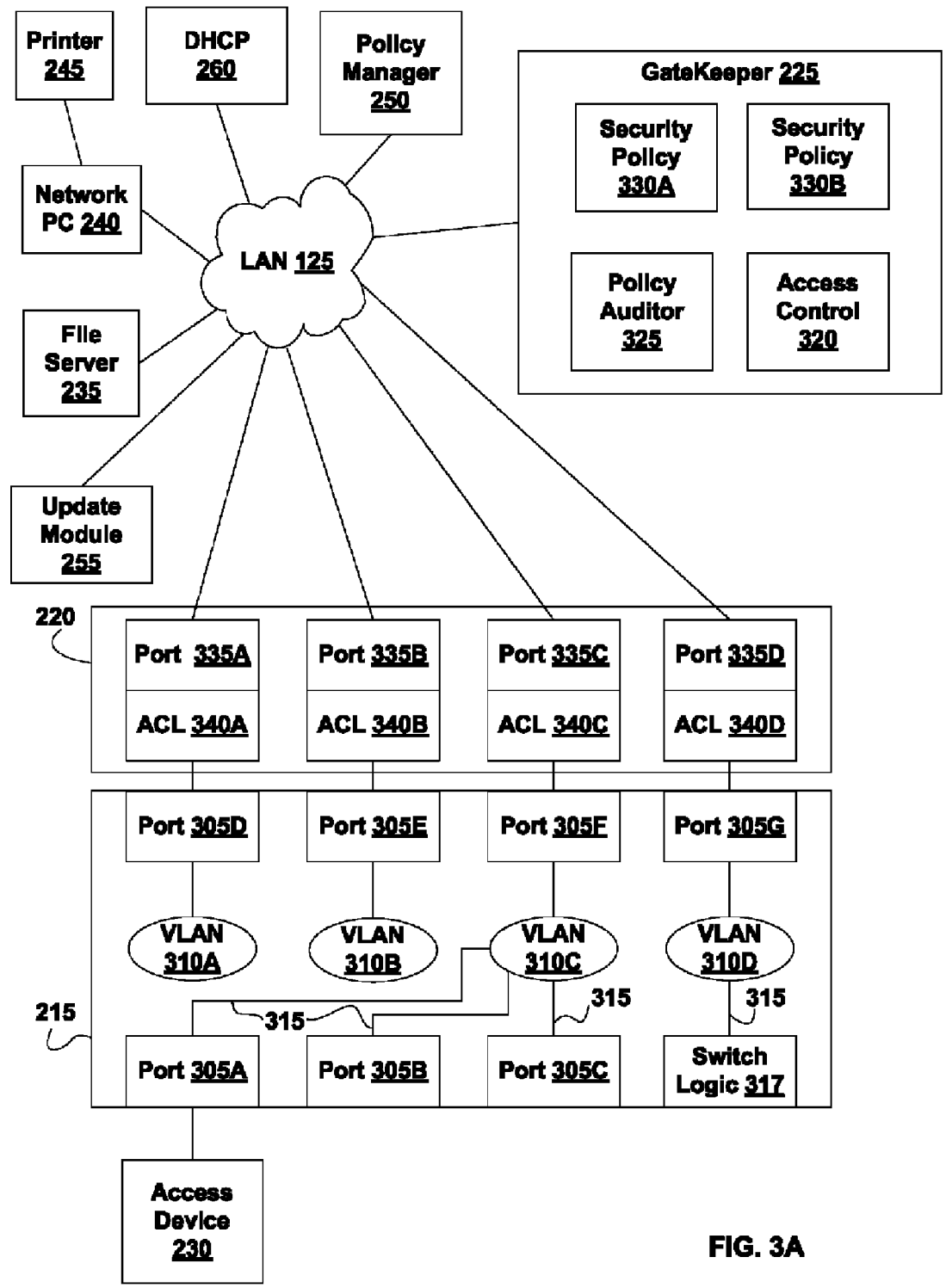
FIG. 3A is a block diagram showing further details of an access point, router and gatekeeper of FIG. 2, according to various embodiments of the invention.

FIG. 3A is a block diagram showing further details of Access Point 215, Router 220 and GateKeeper 225, according to various embodiments of the invention. Access Point 215 is, for example, a network switch, a wireless access point, a remote access virtual private network (VPN), secure socket layer VPN, firewall, or the like. When embodied in a network switch, Access Point 215 includes a series of communication ports, designated Ports 305A-305G and configured for communication with devices such as Access Device 230, Router 220, Less-Restricted Subset 210 and/or Restricted Subset 205.

Figure 3B:
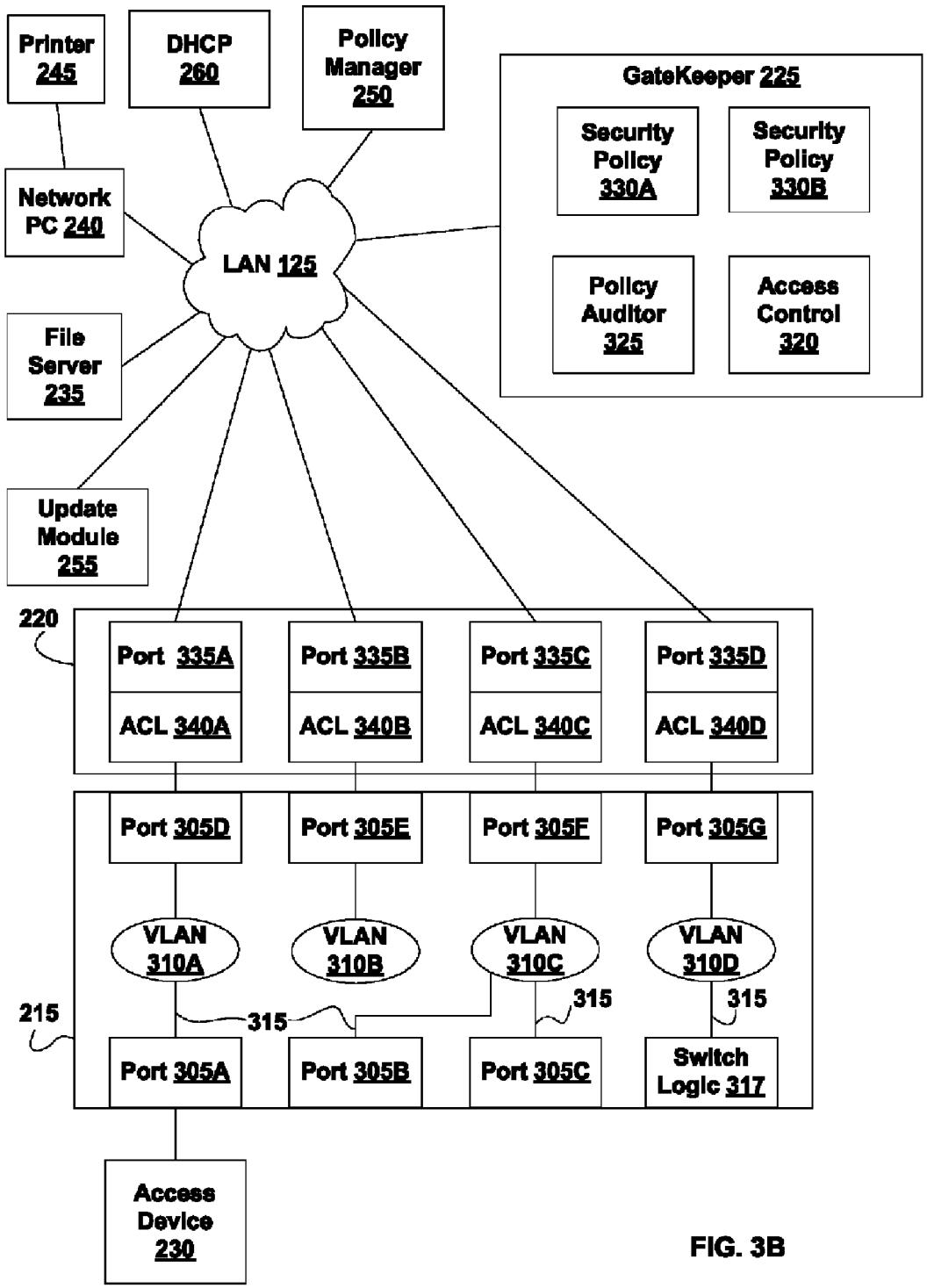
FIG. 3B is a block diagram showing further details of the access point, router and gatekeeper of FIG. 2, after access has been granted to a less-restricted subset of a protected network, according to various embodiments of the invention.

Communication received at one member of Ports 305A-305G is directed internally to another member of Ports 305A-305G via a member of VLANs 310A-310D. VLANs 310A-310D are logical associations between members of Ports 305A-305G. Typically, any members of Ports 305A-305G that are configured to be associated with the same member of VLANs 310A-310D are in bi-directional communication with each other. These associations are illustrated in FIGS. 3A and 3B by Lines 315. For example, with Ports 305A-305G configured as shown in FIG. 3A, communication from Access Device 230 and received at Port 305A is directed to Port 305F because Port 305A and Port 305F are both associated with VLAN 310C. (In some embodiments of Access Point 215, a member of VLANs 310A-310D may be configured such that some members of Ports 305A-305G, even if associated with the same VLAN, are hidden from each other. For example, in these embodiments, both Ports 305A and 305B may be in communication with Port 305F but not with each other.)

The associations between members of Ports 305A-305G and VLANs 310A-310D are controlled by Switch Logic 317 which is accessible to other devices, for example through Port 305G. Switch Logic 317 is configured for configuring and reconfiguring members of Ports 305A-305G responsive to received commands. For example, by receiving an appropriate command, Switch Logic 317 is configured to reconfigure Port 305A to be associated with VLAN 310A, as illustrated in FIG. 3B below. In this configuration, data received at Port 305A is directed to Port 305D via VLAN 310A, rather than to Port 305F.

As is discussed further below, the commands received by Switch Logic 317 may be generated by GateKeeper 225. This communication between GateKeeper 225 and Switch Logic 317 may be accomplished using SNMP (Simple Network Management Protocol), telnet, SSH (Secure Shell), RADIUS (Remote Authentication User Dial-In Service), EAP (Extensible Authentication Protocol), or the like.

In some embodiments, Switch Logic 317 includes a memory (not shown) configured to store the status of Ports 305A-305G and/or identification data regarding Access Device 230. This identification data may include, for example, MAC addresses, IP (internet protocol) addresses, or other data that may be used to identify Access Device 230 or data sent by Access Device 230.

Data passed through members of Ports 305D-305G are received by Router 220 and may be communicated to other elements of Protected Network 200 responsive to access control lists (ACL 340A-340D) associated with Ports 335A-335D of Router 220. ACL 340A through 340D are each communication filters that deny or allow communication to be passed to specific elements or sets of elements within Protected Network 200. For example, ACL 340C may be an access control list that specifically allows communication to network addresses used by GateKeeper 225 and DHCP 260, and blocks communication to all other network addresses. In this case, communication through Port 335C of Router 220 would only be allowed to reach these elements of Restricted Subset 205 and would not be allowed to reach elements of Less-Restricted Subset 210.

ACL 340A-340D of Router 220 may be used to limit communication from Access Device 230 to specific elements of Protected Network 200. For example, in the embodiments illustrated by FIG. 3A, if ACL 340C is configured to restrict communication to Restricted Subset 205, and Ports 305A-305C are associated with VLAN 310C as indicated by Lines 315, then communication via these members of Ports 305A-305G will be restricted to Restricted Subset 205. In typical embodiments, at least one member of ACL 340A-340D is configured to allow communication to Restricted Subset 205 but not to Less-Restricted Subset 210. As is discussed further herein, by reconfiguring a member of Ports 305A-305C to be associated with a different member of VLANs 310A-310D, not subject to the filtering of ACL 340C, communications from Access Device 230 can be directed to elements within Less-Restricted Subset 210, and optionally Restricted Subset 205, rather than merely to Restricted Subset 205.

When Access Point 215 is embodied in a wireless access point, some or all of Ports 305A-305G may be wireless connections rather than physical ports. In these embodiments, Lines 315 may represent logical associations used to control data flow between wireless connections to Access Point 215 and/or members of Ports 305A-305G that are physical communication ports. For example, in some embodiments, MAC addresses are used to distinguish wireless communications from different instances of Access Device 230 and the logical associations (represented by Lines 315) are used to direct these communications to various output channels. The output channels may be other wireless connections or physical members of Ports 305A-305G. These logical associations may be altered by Switch Logic 317 just as associations with members of VLANs 310A-310D are modified. Therefore, the teachings herein that use a network switch as an example of Access Point 215, apply equally to wireless access points.

Switch Logic 317 is controlled by an Access Control 320 included in GateKeeper 225. Access Control 320 is configured to send commands to Switch Logic 317 in order to reconfigure members of Ports 305A-305G. This reconfiguration includes modifying the association of members of Ports 305A-305G with different members of VLANs 310A-310D. In some embodiments, as described further herein, Access Control 320 is also configured to read a status of members of Ports 305A-305G and/or device identification data from Switch Logic 317.

Access Control 320 is responsive to a Policy Auditor 325 included in GateKeeper 225. Policy Auditor 325 is configured to receive a request for access to Less-Restricted Subset 210 from Access Device 230, to determine which of Security Policy 330A or optional Security Policy 330B applies to the current request, to perform a security audit of Access Device 230 based on the appropriate member of Security Policies 330A-330B, and to notify Access Control 320 if the audit is passed. This notice typically causes Access Control 320 to reconfigure a member of Ports 305A-305G using Switch Logic 317. For example, in some embodiments, if Security Policy 330A applies and if Access Device 230 satisfies requirements of Security Policy 330A, then Policy Auditor 325 provides a notice to Access Control 320. In response, Access Control 320 sends appropriate commands to Switch Logic 317. These commands cause changes in Port 305A, such that communication from Access Device 230 is no longer blocked by ACL 340C and can now be received by elements of Less-restricted Subset 310. In alternative embodiments, Security Policies 330A-330B are stored elsewhere in Protected Network 200 accessible to Policy Auditor 325. Restricted Subset 205 optionally includes one, two, or more security policy, such as Security Policies 330A-330B.

FIG. 3B is a block diagram showing further details of Access Point 215, Router 220 and GateKeeper 225 of FIG. 2, after access has been granted to elements of Less-Restricted Subset 210, according to various embodiments of the invention. Port 305A has been reconfigured to be associated with VLAN 310A rather than VLAN 310C. Because VLAN 310A is communicatively coupled to Port 305D and Port 335A (of Router 220) via ACL 340A, any communication received at Port 305A from Access Device 230 is now subject to the filtering effects of ACL 340A rather than ACL 340C. If ACL 340A allows communication to network addresses associated with one or more elements of Less-Restricted Subset 210, the above reconfiguration of Port 305A results in a granting of access to Less-Restricted Subset 210 from Access Device 230. In some embodiments, if ACL 340A is configured to allow access to members of Less-Restricted Subset 210 it is also configured to allow access to members of Restricted Subset 205. Once Port 305A has been reconfigured to be associated with VLAN 310A, future general network traffic between Access Device 230 and Less-Restricted Subset 210 may pass through Ports 305A, 305D and 335A without passing through GateKeeper 225 or other elements of Restricted Subset 205. Further, communication related to access to security of Protected Network 200 may still be received by GateKeeper 225 via Port 305A. For example, GateKeeper 225 may still receive control traffic such as DNS lookups or DHCP requests, or requests to access additional elements of Protected Network 200, or requests to continue to access the Less-Restricted Subset 210.

In some embodiments, members of VLAN 310A-310D and ACL 340A-340D are optionally used to grant or bar access to different subsets of Protected Network 200, Less-Restricted Subset 210, or Restricted Subset 205. For example, ACL 340B may be configured to grant access to File Server 235, Policy Manager 250 and GateKeeper 225. In this case, associating a member of Ports 305A-305C with VLAN 310B may provide access to these devices from an instance of Access Device 230. Granting of access to a specific region of Less-Restricted Subset 210 is optionally responsive to which member of Security Policies 330A-330B has been satisfied.

Figure 4:
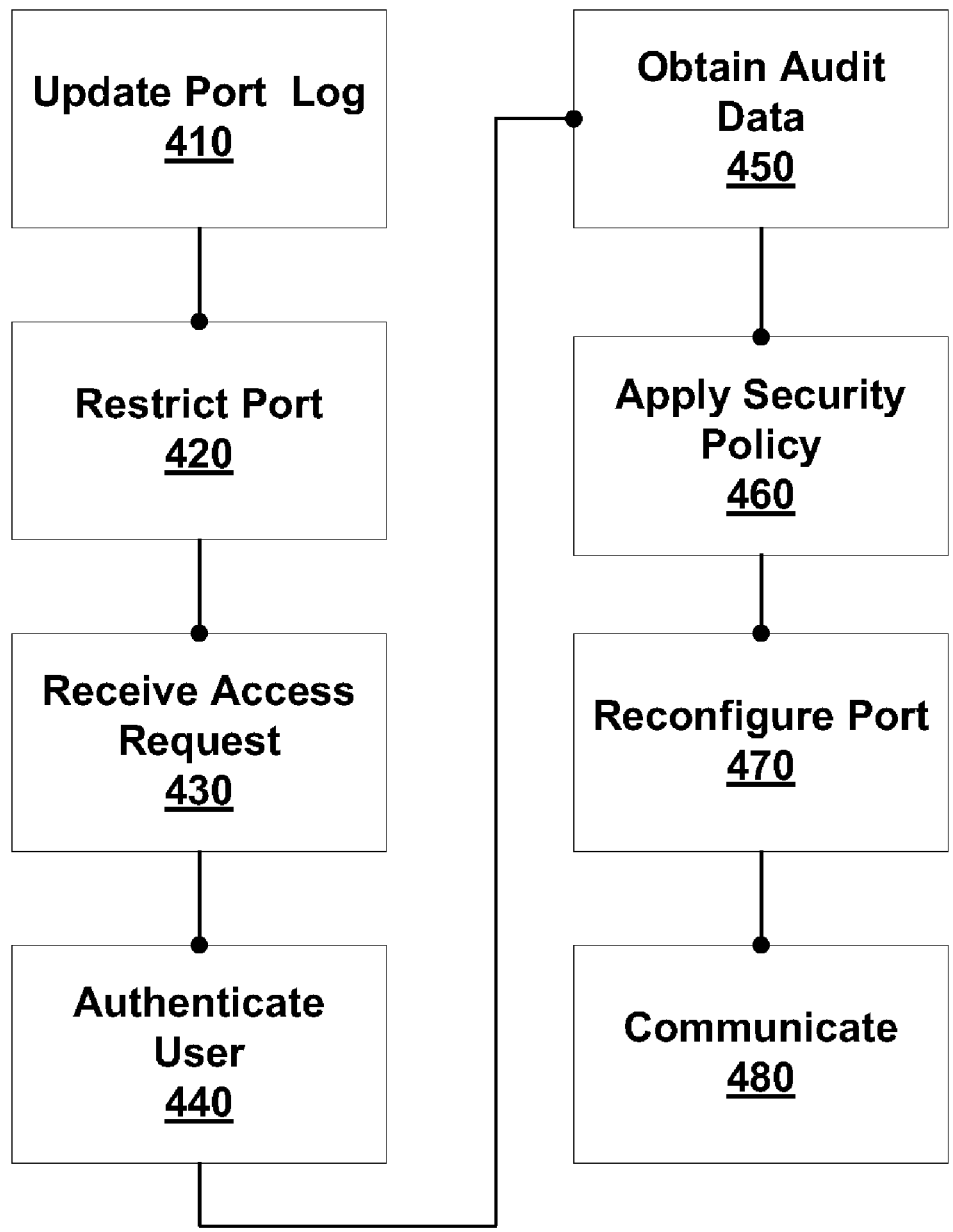
FIG. 4 is a flowchart illustrating a method of granting access to a protected network, according to various embodiments of the invention.

FIG. 4 is a flowchart illustrating a method of granting access to Less-Restricted Subset 210 (FIG. 2), according to various embodiments of the invention. In these embodiments, an Update Port Log Step 410 and a Restrict Port Step 420 are used to prepare an open (unused) communication port on Access Point 215 for receiving a request for access to Less-Restricted Subset 210. This request is received from Access Device 230 in a Receive Access Request Step 430. In response, GateKeeper 225 authenticates a user, obtains audit data, and applies a security policy in an Authenticate User Step 440, an Obtain Audit Data Step 450 and an Apply Security Policy Step 460, respectively. If the security policy is satisfied, then in a Reconfigure Port Step 470, GateKeeper 225 reconfigures the communication port of Access Point 215 to which Access Device 230 has connected. Finally, the reconfigured communication port is used to pass communication between Access Device 230 and one or more element of Less-Restricted Subset 210 in a Communicate Step 480. Further details of these steps are discussed herein.

In Update Port Log Step 410, Access Control 320 reads port configuration data from Access Point 215 to determine the current configuration of Ports 305A-305G. If any of Ports 305A-305G have been configured by an administrator of Access Point 215, then in Update Port Log Step 410 the administrator specified configuration(s) are stored for later use during Reconfigure Port Step 470. Typically, the read configuration data is stored in a port configuration table, for example within GateKeeper 225. Update Port Log Step 410 is optional, as discussed further herein.

In Restrict Port Step 420, Access Control 320 configures those members of Ports 305A-305G that may be accessed by external devices, such as Access Device 230. These communication ports are configured to be associated with VLAN 310C such that any data (e.g., communications) they receive from external devices are directed to Port 305F and, thus, to subject to ACL 340C. ACL 340C is configured to allow communication to, for example, DHCP 260 and GateKeeper 225. As a result, any requests for access received from external devices are prevented from reaching Less-Restricted Subset 210 and instead are received by elements of Restricted Subset 205. Restrict Port Step 420 results in a configuration such as that illustrated in FIG. 3A. In this configuration, those members of Ports 305A-305G that may be accessed by external devices include Port 305A, Port 305B and Port 305C. As a result of Restrict Port Step 420, these members of Ports 305A-305G are associated with VLAN 310C and communicatively coupled to Protected Network 200 through ACL 340C. Restrict Port Step 420 is optional, for example when members of Ports 305A-305C have been configured to communicate data to elements of Restricted Subset 205 by an administrator of Access Point 215.

In Receive Access Request Step 430, a request for access to Less-Restricted Subset 210 is received at one of Ports 305A-305C configured to pass data to DHCP 260 and Gatekeeper 225. Typically, this request is received from an external device such as Access Device 230. Because Port 305A, Port 305B and Port 305C are configured to pass data to DHCP 260 and Gatekeeper 225, the received access request passes through Access Point 215 and is received by either DHCP 260 or Gatekeeper 225 In typical embodiments, an initial access request is first acknowledged by DHCP 260 which assigns a dynamic network address (e.g., IP address) to Access Device 230 and returns, to Access Device 230, a network address associated with GateKeeper 225 or more specifically Policy Auditor 325. Using this network address, Access Device 230 may engage in further communication with GateKeeper 225 or Policy Auditor 325. In some embodiments, DHCP 260 and instances of GateKeeper 225 are associated with a local domain name service configured to provide network addresses associated with a particular instance of GateKeeper 225 configured to manage (reconfigure) the particular Access Point 215 to which Access Device 230 is connected.

In optional Authenticate User Step 440, Policy Auditor 325 authenticates the identity of Access Device 230 and/or a user of Access Device 230. This authentication may be required by a member of Security Policies 330A-330B. In various embodiments, the authentication may include receipt of a user name and password, receipt of a MAC address, reading of data stored on Access Device 230, communication with an agent executing on Access Device 230, or the like.

In optional Obtain Audit Data Step 450, Policy Auditor 325 collects further data to perform a security audit of Access Device 230 responsive to Security Policy 330A or Security Policy 330B. In some embodiments, Obtain Audit Data Step 450 includes sending system data requests to Access Device 230, Router 220, or Access Point 215. The requested system data may include, for example, operating system status (version, updates, etc.), antivirus software status, information concerning devices connected to Access Device 230, Windows registry information, MAC address, IP addresses, cookies, status of applications executing on Access Device 230, or the like.

In some embodiments, Obtain Audit Data Step 450 is facilitated by an agent running on Access Device 230. For example, Access Device 230 may include a software agent configured to monitor local security and to report results of this monitoring to Policy Auditor 325.

In Apply Security Policy Step 460, a security audit of Access Device 230 is performed by Policy Auditor 325 responsive to a member of Security Policy 330A or Security Policy 330B. The particular member of Security Policy 330A or Security Policy 330B used to perform the audit may be responsive to the identity of Access Device 230, an identity of a user of Access Device 230, a part of Less-Restricted Subset 210 to which access is requested, or the like. The security audit typically includes determining if Access Device 230 satisfies requirements of the security policy. The security audit optionally includes active probing, scanning, and/or collection of third party data regarding Access Device 230. In some embodiments, Authenticate User Step 440 is considered part of the security policy audit.

As is discussed further herein, in some embodiments, satisfaction of all the requirements of a particular security policy results in access to Less-Restricted Subset 210, while satisfaction of a subset of the requirements associated with the particular security policy is considered partial satisfaction of the security policy and may result in a more limited access to Less-Restricted Subset 210.

In some embodiments, Apply Security Policy Step 460 includes using Update Module 255 (FIG. 2) to overcome deficiencies in the security of Access Device 230. For example, in one embodiment, Apply Security Policy Step 460 includes updating antivirus software on Access Device 230 in response to a security audit that determined that the current antivirus software is out-of-date.

In Reconfigure Port Step 470, the communication port of Access Point 215, to which Access Device 230 is communicatively connected, is reconfigured responsive to a successful security audit in Apply Security Policy Step 460. This communication port is reconfigured such that data received by the communication port is passed to one or more elements of Less-Restricted Subset 210 rather than merely elements of Restricted Subset 205 (e.g., GateKeeper 225). For example, FIG. 3A shows Port 305A prior to execution of Reconfigure Port Step 470 and FIG. 3B shows Port 305A following execution of Reconfigure Port Step 470. In FIG. 3B, Port 305A is associated with VLAN 310A and, thus, communicatively coupled through Port 305D to Protected Network 200 subject to the restrictions of ACL 340A. The restrictions of ACL 340A allow access to all or part of Less-Restricted Subset 210, as well as optionally all or part of Restricted Subset 205.

In typical embodiments, reconfiguration of Port 305A is accomplished by sending commands from Access Control 320 to Switch Logic 317. These commands or responses to requests from Switch Logic 317 are optionally sent via SNMP, telnet, SSH, RADIUS, EAP, or the like, and are responsive to data received in Authenticate User Step 440 and Obtain Audit Data Step 450, and/or to the security audit performed in Apply Security Policy Step 460. In response to these commands, Switch Logic 317 configures Port 305A to be associated with VLAN 310A and, thus, communicate through Port 305D.

While access control lists (ACL 340A-340D) within Router 220 are typically configured prior to Receive Access Request Step 430, in some embodiments, Reconfigure Port Step 470 further includes configuring one or more members of ACL 340A-340D. In alternative embodiments, reconfiguring of members of ACL 340A-340D may be used to grant access to elements of Less-Restricted Subset 210 as an alternative to associating members of Ports 305A-305G to different members of VLANs 310A-310D.

Access Control 320 may selectively grant access to different parts of Protected Network 200 if ACL 340B is configured to allow access to different elements within Protected Network 200 than ACL 340A is configured. For example, in one embodiment, Access Device 230 will receive access to all of Less-Restricted Subset 210 if Port 305A is associated with VLAN 310A, or alternatively Access Device 230 will receive access to only a part of Less-Restricted Subset 210 if Port 305A is associated with VLAN 310B. When Port 305A is associated with VLAN 310A, as in FIG. 3B, communication from Access Device 230 is directed through Port 335A of Router 220 subject to ACL 340A and, thus, may access only those elements of Protected Network 200 allowed by ACL 340A. When Port 305A is associated with VLAN 310B, communication from Access Device 230 is instead passed through Port 335B subject to ACL 340B and may access only those elements of Protected Network 200 permitted by ACL 340B. A selection between granting access to a first or second part of Protected Network 200 can, therefore, be made using Access Control 320. The selection is optionally responsive to the security policy used in Apply Security Policy Step 460, to whether the security policy was fully or partially satisfied, to data obtained in Authenticate User Step 440 or Obtain Audit Data Step 450, or the like.

As illustrated in the above example, a member of Ports 305A-305G, through which Access Device 230 is requesting access, may be reconfigured to more than one alternative setting in Reconfigure Port Step 470. For example, in various embodiments a communication port may be reconfigured to a prior administrator specified configuration previously read in Update Port Log Step 410, reconfigured to be linked to a specific port responsive to the request received in Receive Access Request Step 430, reconfigured to grant access to a particular part of Less-Restricted Subset 210, reconfigured to a default setting, and/or the like. By reading administrator specified port configurations in Update Port Log Step 410 and reconfiguring communication ports back to these read configurations in Reconfigure Port Step 470, an administrator may reconfigure Protected Network 200 without concern that their specifications will be lost or permanently overwritten by methods of the invention. In embodiments wherein a communication port is not reconfigured to a previous administrator specified configuration, Update Port Log Step 410 is optional.

In Communicate Step 480, communication occurs between Access Device 230 and elements of Less-Restricted Subset 210 via the communication port reconfigured in Reconfigure Port Step 470. However, in some embodiments, ACL 340A is configured to allow access to GateKeeper 225 as well as Less-Restricted Subset 210. Thus, general network traffic does not need to pass through GateKeeper 225, while communication regarding security of Protected Network 200 is optionally received by GateKeeper 225. Further communication between Access Device 230 and GateKeeper 225 may provide a variety of advantages. For example, further communication between GateKeeper 225 and an agent executing on Access Device 230 may allow for continuing audits of security aspects of Access Devices 230. These audits may be similar to those performed in Apply Security Policy Step 460. In one embodiment, ACL 340A is configured to grant access to all of Protected Network 200.

Further communication between GateKeeper 225 and an agent executing on Access Device 230 may also allow for a user of Access Device 230 to explicitly logoff Protected Network 200. An explicit logoff will result in reconfiguration of Port 305A such that access is again restricted to Restricted Subset 205. A logoff may alternatively be responsive to a timeout of communication with Access Device 230, a SNMP trap message indicating a connection has been broken, or the like.

According to embodiments like that disclosed in U.S. Provisional Patent Application No. 60/513,080, the disclosure of which has been incorporated herein by reference, an AP (e.g., a switch or wireless access point (WAP) which is used to connect end points to the corporate network) may be programmed to prohibit access by the PC (e.g., notebook, desktop PC, PDA, or similar computing device) to the corporate network until authentication with the authentication server passes AND an audit with the software agent with the GK (e.g., software that acts as a gatekeeper by granting or denying access to the corporate network from end points after auditing the end point based on certain criteria) passes, while still supporting the existing encryption and authentication functionality. The method used to support auditing functionality over the existing 802.1x protocol implementation is complicated and not an obvious variation of the 802.1x protocol.

According to an embodiment like that disclosed in U.S. Provisional Patent Application No. 60/513,080, the disclosure of which has been incorporated herein by reference, the auditing protocol takes place between the EP (e.g., end point which can either be a PC or network device) agent software and the GK. A client filter redirects calls for audit information to an agent on the EP and sends the responses to the 802.1x compliant AP which relays them to the EAP server. The EAP server then calls a server filter which sends the responses to the GK for evaluation. The GK sends requests for more information on the reverse path and this continues until the audit is completed. If the audit is successful, the server sends a message to the AP which enables the EP's port allowing access for the PC. If the audit fails, the port on the AP is left disabled.

Figure 5:
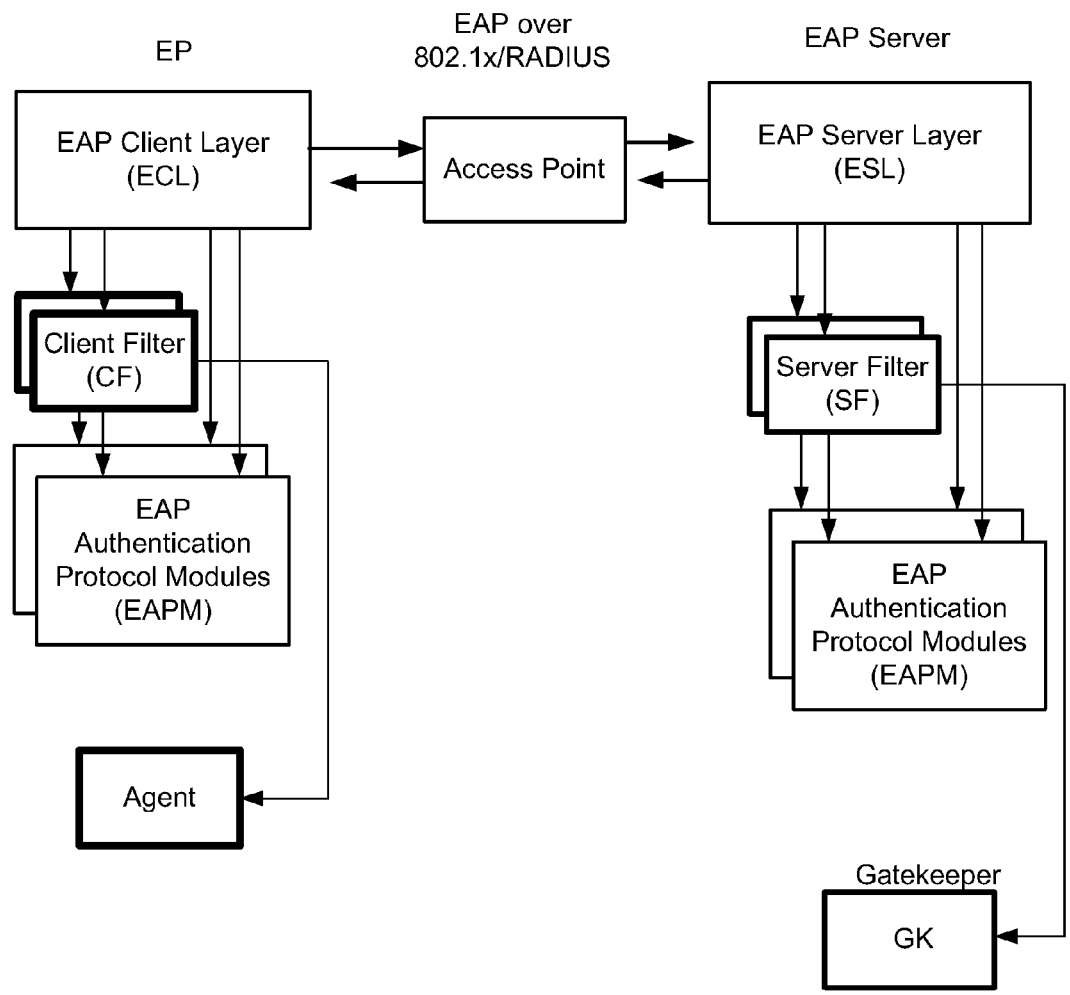
FIG. 5 is a block diagram showing EAP over 802.1x/Radius.

According to an exemplary embodiment, client filters (CF) and server filters (SF) are added along with an agent and GK to perform audits, as highlighted in FIG. 5. There may be one or more instances of the CF and SF, which correspond to the separate EAP Authentication Modules (EAPM) that are supported. Note that the agent and GK are logical components. The functionality of the agent and GK can be embedded into the CF and SF, respectively, or in the case of the GK, may reside on a separate server.

Figure 6A:
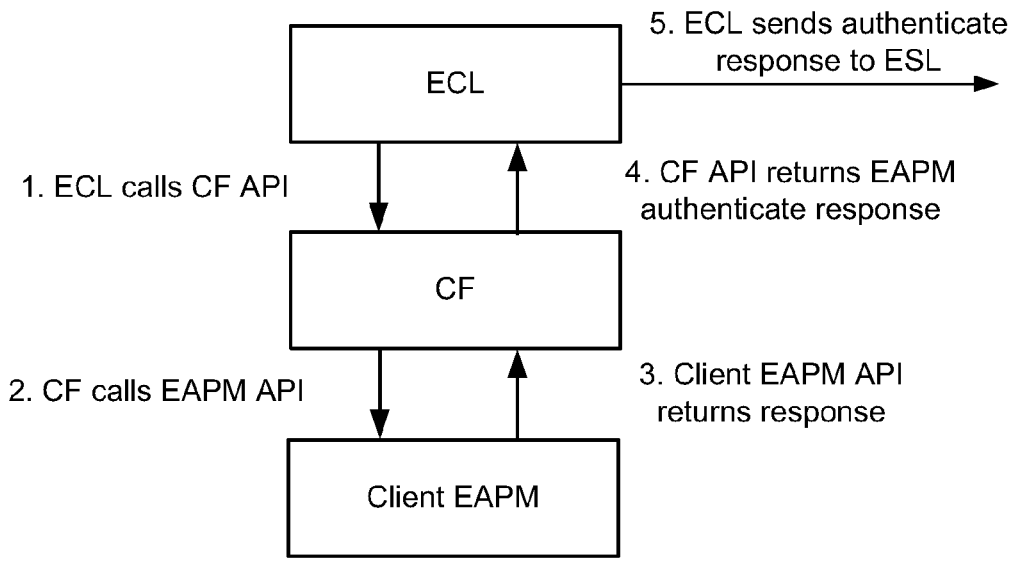
FIG. 6A is a block diagram showing a client in authentication state.
Figure 6B:
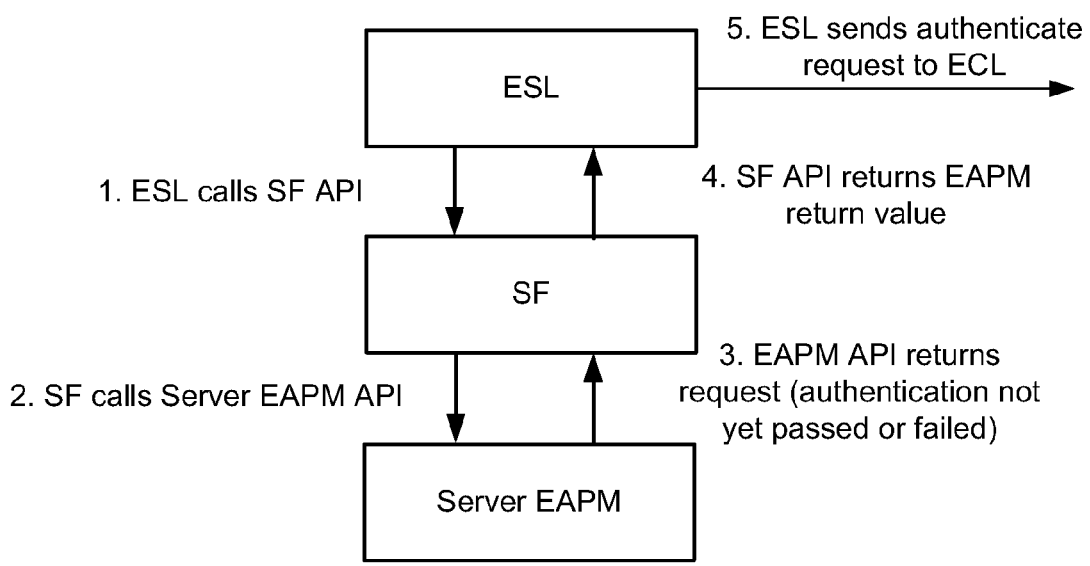
FIG. 6B is a block diagram showing a server in authentication state.

The CF and SF APIs have APIs which correspond to the EAPM APIs. Therefore, the EAP Client Layer (ECL) or EAP Server Layer (ESL) can call the CF and SF instances corresponding to a particular authentication method as shown in FIGS. 6A and 6B. To the ECL and ESL, each instance of the CF and SF appears to be an EAPM which incorporates the functionality of the original EAPM prior to completion of the success response by the server EAPM.

To use the invention as disclosed in U.S. Provisional Patent Application No. 60/513,080, the disclosure of which has been incorporated herein by reference, the ECL and ESL are configured to use the instance of the CF and SF corresponding to the desired authentication method. This authentication method corresponds to an authentication method supported by one of the EAPMs.

The ECL calls the corresponding CF to perform authentication, which at first calls the appropriate EAPM to obtain the proper authentication response. The authentication response is returned by the CF to the ESL, which sends the response to the server's ESL, SF, and EAPM. This process continues until the authentication either succeeds or fails, at which time the server's authentication EAPM returns a success or failure response to the SF.

Figure 7:
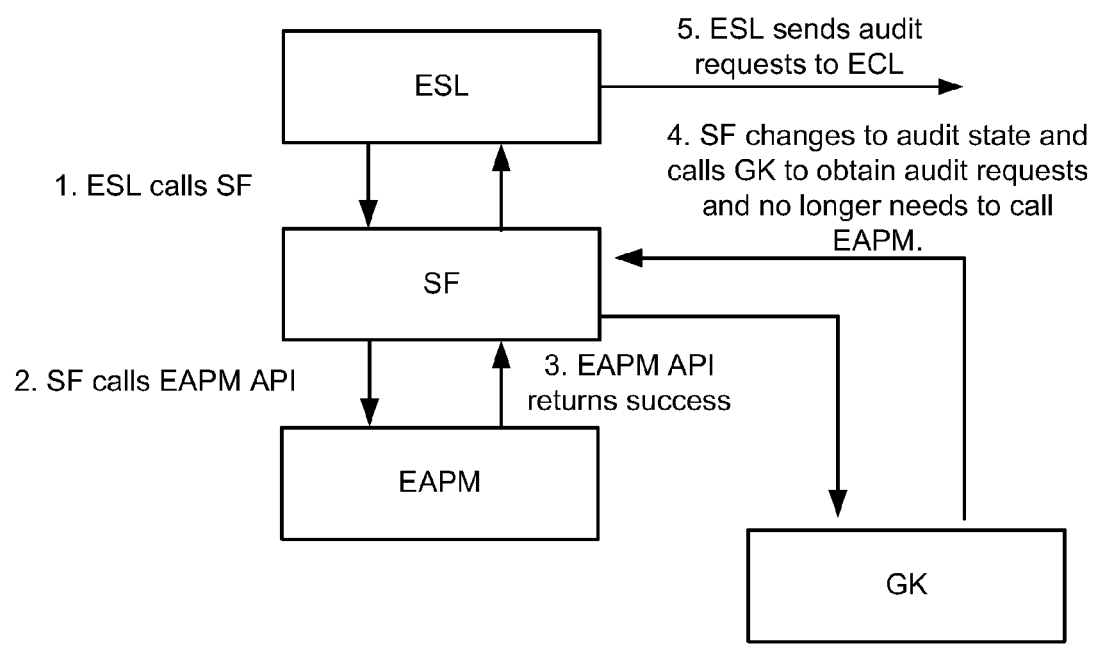
FIG. 7 is a block diagram showing a server changing to audit state.

If the SF receives a success response from the server EAPM as shown in FIG. 7, the SF changes to the audit state and calls GK to obtain audit requests to send back to the client. In this state, the SF returns specially formatted audit requests to the ESL which are passed to the ECL, and eventually to the CF which sends back audit responses to the SF requests.

On the client, audit requests are passed to the agent API instead of to the client EAPM. The agent returns information about the local system, which is converted to audit responses that are sent to the server.

Figure 8A:
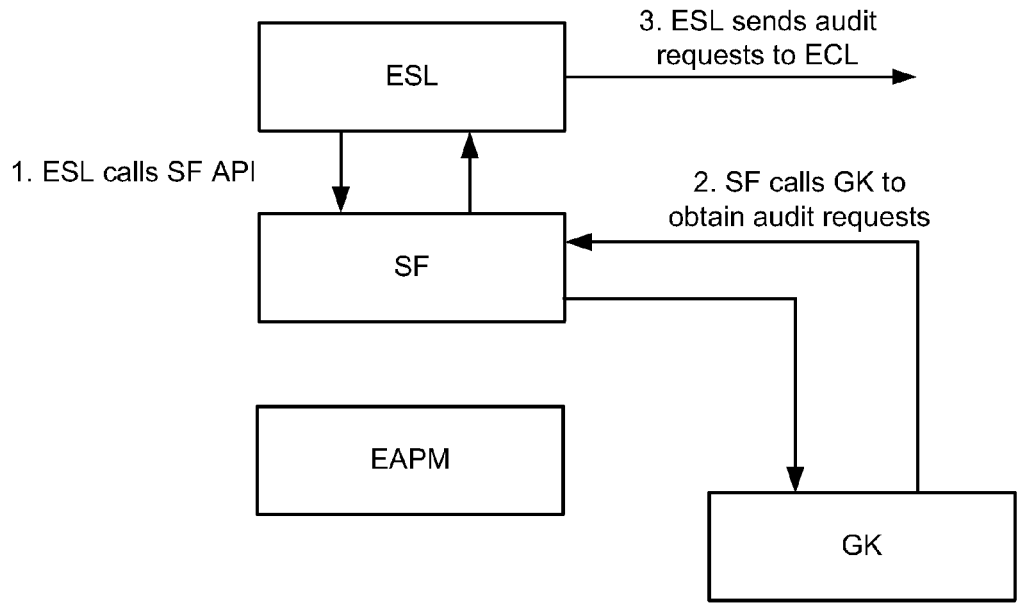
FIG. 8A is a block diagram showing a server in audit state.
Figure 8B:
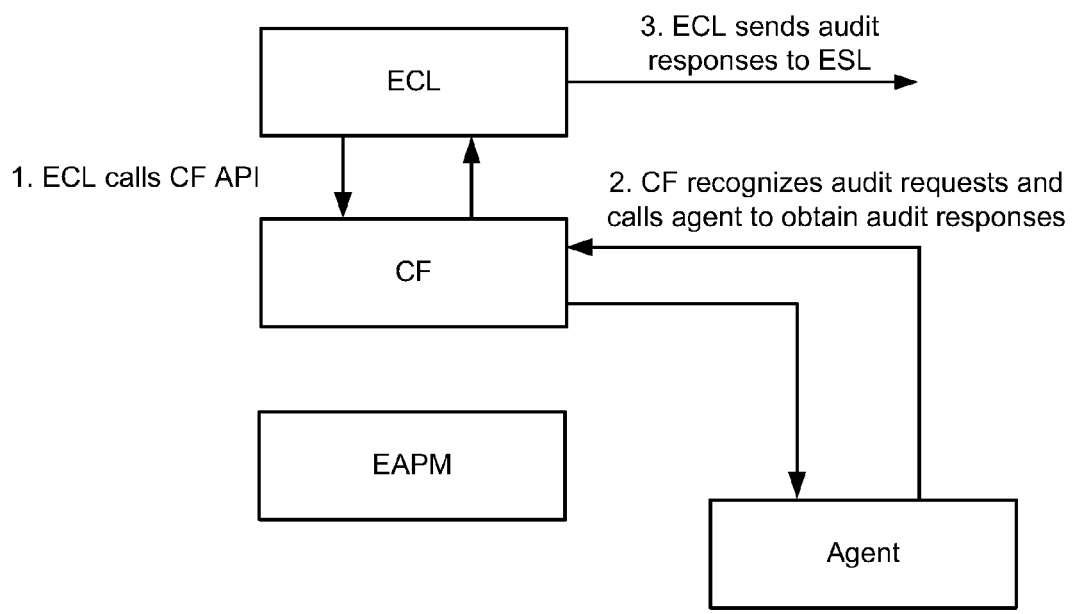
FIG. 8B is a block diagram showing a client responding to audit requests.
Figure 9:
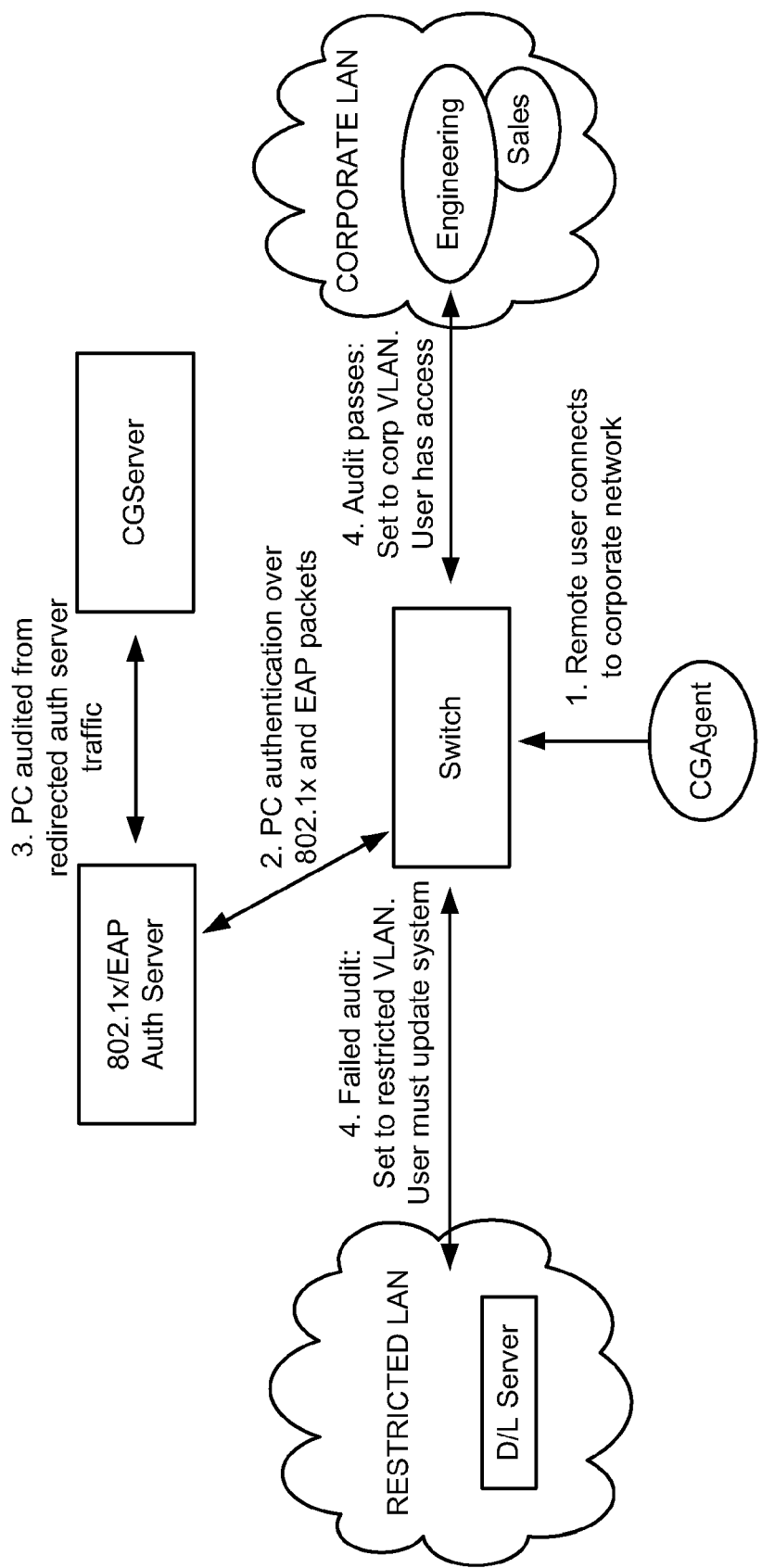
FIG. 9 is a block diagram showing a system in 802.1x mode where normal traffic does not traverse CGS.

During the audit state, the SF and CF exchange audit requests and responses about the EP as shown in FIGS. 8A and 8B. The ECL and ESL continue to communicate with the CF and SF, but instead of calling the EAPM, the CF and SF call the agent and GK respectively, to perform this exchange. The audit session continues until the necessary audit information has been passed to the SF.

If the audit indicates the client EP is in compliance, the SF returns a success response. If the VLAN for the EP is specified in the policy, then the VLAN that should be used for this EP is passed back as well.

If the GK determines that the EP has failed the audit, GK returns a failure response to SF which causes one of the following: (1) the SF returns a failure to ECL, and the corresponding port on the AP is left disabled, or (2) the SF returns a success response to the ECL but specifies that the EP should be set to a restricted VLAN where the EP has limited network access. In either case, the EP is isolated from the company network until it successfully passes an audit with the GK.

After the audit has been performed, "keep alives" and updates regarding changes to previous audit information are exchanged. Changes are reevaluated and if inconsistent with the current state, access to the network is modified appropriately by changing the VLAN used for the EP or by terminating access by the EP by communicating with the AP.

Several embodiments are specifically illustrated and/or described herein. However, it will be appreciated that modifications and variations are covered by the above teachings and within the scope of the appended claims without departing from the spirit and intended scope thereof. For example, the teachings herein may be applied to embodiments wherein Access Point 215 is a wireless access point and MAC addresses, or the like, are used instead of VLANs to separate traffic from different instances of Access Device 230. It is, thus, anticipated that network management techniques other than VLANs may be used to distinguish Less-Restricted Subset 210 from Restricted Subset 205. In some embodiments, various aspects of GateKeeper 225 may be incorporated into Access Point 215 and/or Router 220. GateKeeper 225 and Policy Manager 250 are each optionally implemented on a plurality of computing devices within Restricted Subset 205.

In some embodiments, GateKeeper 225 uses DHCP 260 to assign IP addresses from a restricted IP address range depending on the compliance of Access Device 230 to security policies 330A-330B. GateKeeper 225 inserts DHCP options and/or modifies the IP source addresses of DHCP-DISCOVER and DHCPREQUEST packets, based on the compliance of the Access Device 230 to security policies 330A-330B. DHCP 260 is configured to provide an address from the restricted address range or the less-restricted address range based on the source address and/or options present in the DHCP request or discover packets that have been modified by GateKeeper 225. In some embodiments, the insertion of DHCP options and/or modification of IP source addresses may be used to characterize restricted and less-restricted subnets, rather then configuring port associations with VLANs as discussed herein.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method for network access control, the method comprising:
   receiving audit data pertaining to a device that does not have access to a less-restricted subset of a network;
   auditing the device in accordance with a security policy based at least in part on the audit data;
   reconfiguring an access point to allow access to the less-restricted subset of the network in response to the security policy audit;
   receiving updated audit data pertaining to the device subsequent to reconfiguring the access point; and
   monitoring continued compliance of the device with the security policy using the updated audit data.

2. The method of claim 1, wherein monitoring of the device for continued compliance with the security policy includes continued communications with the device.

3. The method of claim 2, wherein an interruption of continued communication indicates that the device is no longer compliant.

4. The method of claim 1, wherein the access point is reconfigured to allow access to a different subset of the network in response to the device failing to comply with the security policy while being monitored.

5. The method of claim 1, wherein the security policy includes authentication of the user of the device.

6. The method of claim 4, wherein an agent running on the device collects the audit data.

7. The method of claim 6, further comprising updating the device to comply with the security policy when the device fails to comply with the security policy.

8. The method of claim 6, wherein the security policy audit is based at least in part on audit data collected by the agent concerning operating system of the device.

9. The method of claim 6, wherein the security policy audit is based at least in part on audit data collected by the agent, and that concerns antivirus software on the device.

10. The method of claim 6, wherein the security policy audit is based at least in part on audit data collected by the agent, and that concerns other devices coupled to the device.

11. The method of claim 6, wherein the security policy audit is based at least in part on audit data collected by the agent, and that concerns registry information of the device.

12. The method of claim 6, wherein the security policy audit is based at least in part on audit data collected by the agent, and that concerns a network adapter of the device.

13. The method of claim 6, wherein the security policy audit is based at least in part on audit data collected by the agent, and that concerns applications executing on the device.

14. The method of claim 1, wherein the security policy audit is based at least in part on information obtained from an active probe of the device.

15. The method of claim 1, wherein the security policy audit is based at least in part on information obtained from a third party application or service.

16. The method of claim 1, wherein the security policy audit is based at least in part on the information concerning an identity of a user of the device.

17. The method of claim 1, wherein monitoring for continued compliance includes a user not logging off of the device.

18. The method of claim 6, wherein updated audit data pertaining to the device continues to be received from the agent after reconfiguring the access point.

19. The method of claim 6, wherein updated audit data pertaining to the device continues to be received from the agent while the device has access to the less-restricted subset of the network.

* * * * *